United States Patent

[11] 3,596,768

[72] Inventor George R. Whitten, Jr.
2033 Mendon Road, Cumberland, R.I. 02864
[21] Appl. No. 865,269
[22] Filed Oct. 10, 1969
[45] Patented Aug. 3, 1971

[54] APPARATUS FOR WATER PURIFICATION
10 Claims, 9 Drawing Figs.

[52] U.S. Cl. ............................................. 210/167
[51] Int. Cl. ........................................ B01d 35/26
[50] Field of Search ........................... 210/169, 167, 290

[56] References Cited
UNITED STATES PATENTS

| | | | |
|---|---|---|---|
| 1,979,623 | 11/1934 | Hunter | 210/169 |
| 2,302,450 | 11/1942 | Laughlin | 210/290 |
| 2,502,052 | 3/1950 | Landon et al. | 210/169 |
| 3,169,920 | 2/1965 | Payne | 210/169 |
| 3,268,079 | 8/1966 | Sharrow, Jr. | 210/169 |

*Primary Examiner* — Reuben Friedman
*Assistant Examiner* — T. A. Granger
*Attorney* — Synnestvedt & Lechner

ABSTRACT: A reservoir of purified water is prepared from a natural body of water by constructing a prefiltering levee through the water to segregate the reservoir area from the remainder of the water body, pumping water from the reservoir area into the remainder, cleaning the floor of the reservoir area if necessary, installing a water purification unit in the reservoir, and then allowing the water to filter through the levee from the remainder of the water body into the reservoir for continuous further purification and recirculation by the installed unit. The water purification unit includes a mixing chamber, a filtering chamber, skimming means for intaking surface water into the mixing chamber, submerged inlets for intaking water into the mixing chamber from below the water's surface, a pump for passing water from the mixing chamber through the filtering chamber, and outlet means for passing the filtered water directly back to the reservoir. The preferred skimming means comprises a mobile skimming gutter to insure a constant intake of surface water at various reservoir water levels and a submersible pump is preferably positioned in the mixing chamber to force the mixed water through one or more filter cells provided in the filtering chamber. The outlet means are preferably disposed to set up recirculation currents using the earth's rotation effect, and means are also provided for backwashing the filter cells. To insure that the pump does not run dry the submerged inlet flow is preferably float modulated to provide the full capacity of the pump if the skimmed flow is temporarily reduced. Various purifying chemicals may be added to the processed water in its passage through the unit, and in a modified form of the invention, a portion of the purified water is passed back to the remainder of the water body for progressive purification thereof.

INVENTOR
GEORGE R. WHITTEN, JR.
BY Chittick, Pfund, Birch,
Samuels & Lauthier
ATTORNEYS

APPARATUS FOR WATER PURIFICATION

BACKGROUND OF THE INVENTION

This invention relates to water purification and is more particularly directed to a method of purifying segments of bodies of polluted water and a water purification unit having particular utility in practicing such a method.

The ever increasing menace of water pollution has seriously decreased the number of natural water bodies available for potable water supply, recreational swimming and industrial needs. In order to provide such facilities for our ever expanding needs, many municipalities have attempted to build large-scale water-processing plants and artificial swimming pools capable of purifying high volumes of water. Such plants and pools have proven in many cases to be prohibitively expensive to handle the demands presented, and in respect to recreational facilities, have proven to be far less pleasurable swimming areas in contrast to natural bodies of water such as lakes, ponds and the like.

Previous attempts have been made to purify polluted bodies of water. These prior attempts, however, have been in the main unsuccessful because of the magnitude of the problem of purifying an entire body of water. Even in the cases when such efforts have been successful, they have produced a concomitant disadvantage in that the body of water is then frequently unfit for most wild life, thereby having shortcomings from a conservation point of view.

SUMMARY OF THE INVENTION

The present invention contemplates a water purification unit for segregating a reservoir area from the remainder of a natural body of water and then installing the water purification unit in the reservoir to purify that portion to produce a reservoir of pure water for recreational or water supply purposes. Using this invention, municipalities can develop water supply reservoirs and/or swimming facilities from lakes, ponds and streams which are presently useless due to contamination and pollution. When the reservoir is used for swimming, the pleasure derived from its use is enhanced because the natural shoreline and associated virtues of a natural body of water are retained.

In smaller bodies of water (either natural or artificial) segmenting may not be necessary and the entire water body may be purified by the water purification unit of the invention. In either manner a polluted or contaminated body of water can be reclaimed to provide purified, treated water for a town or city water supply, recreational swimming or industrial needs.

In accordance with the invention a prefiltering levee such as of bank-run gravel or other suitable filtering material is constructed within a body of water to segregate a reservoir portion from the remainder thereof. The water within the reservoir portion is then pumped back into the remainder of the lake, pond or stream. The floor of the reservoir may be cleaned as by dredging to remove contaminants if necessary, and covered with an inert material such as crush stone, sand or the like. A water purification unit is then installed in the reservoir area and the pumping means removed to allow water from the remainder of the lake to pass through the prefiltering levee into the reservoir. In its passage through the levee, most of the heavy suspended particles are removed from the water. A second filtering pass is provided for this water by the water purification unit of the invention. The unit may be installed in any body of water without the need of any external piping to or from the water body to intake or discharge water. By incorporating inlet and outlet means in the unit itself, the costly and time consuming process of individual design for each water supply and recreational facility, as well as on shore equipment buildings, external piping and the high cost of construction labor presently required to produce comparable pure water reservoirs are eliminated. Each unit is designed to purify a large volume of water to a degree of purity acceptable to public health officials and may be prefabricated at a remote point and merely installed in the prepared site. If desired, a number of the prefabricated units may be installed to purify larger reservoirs. The invention, therefore, greatly reduces the cost of providing pure water supply and mass recreational swimming areas from presently useless polluted natural water bodies.

Accordingly, it is an object of the invention to provide a compact, portable water purification unit capable of purifying a water reservoir without the need for any external inlet or outlet piping associated therewith.

DETAILED DESCRIPTION OF THE INVENTION

These objects and other objects and advantages of the present invention will become more apparent as the detailed description thereof proceeds with continued reference to the drawings wherein.

Figure 1:
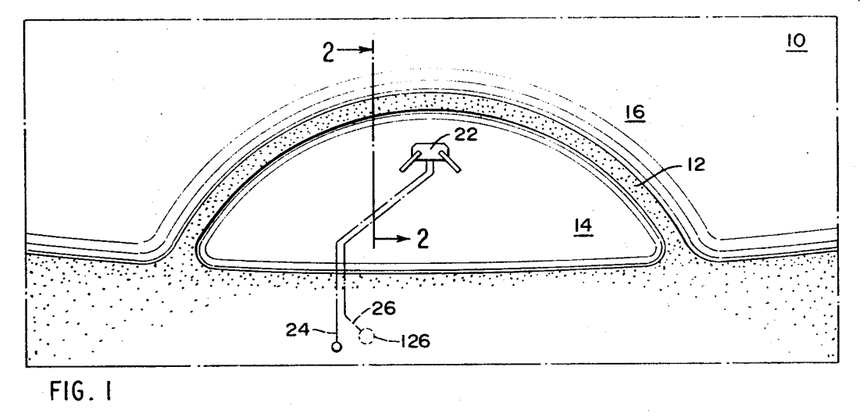
FIG. 1 is a plan view of a pure water reservoir prepared in accordance with the invention.
Figure 2:
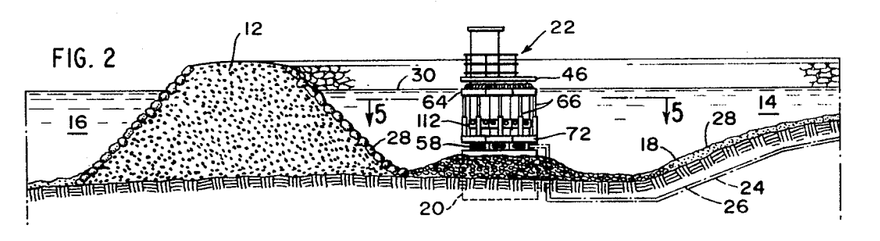
FIG. 2 is a sectional view along line 2-2 of FIG. 1.
Figure 3:
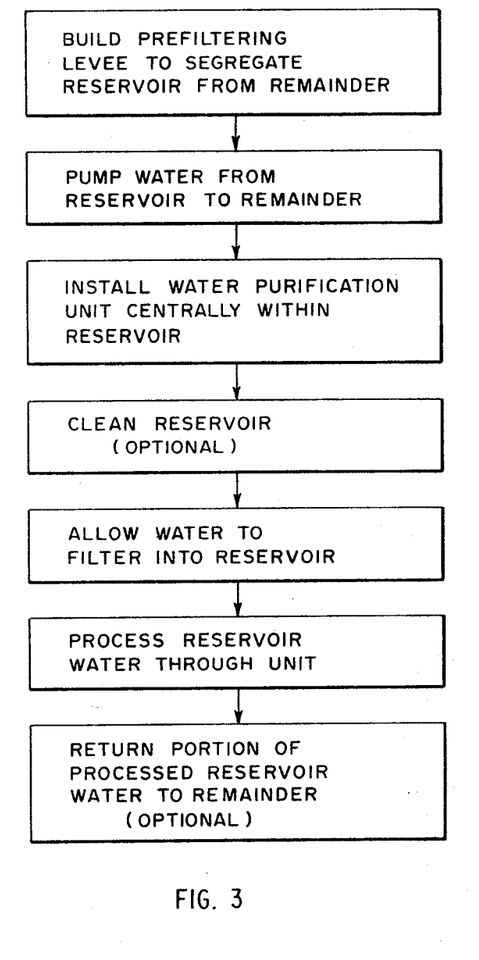
FIG. 3 is a block diagram of the method employed to produce the reservoir shown in FIGS. 1 and 2.
Figure 4:
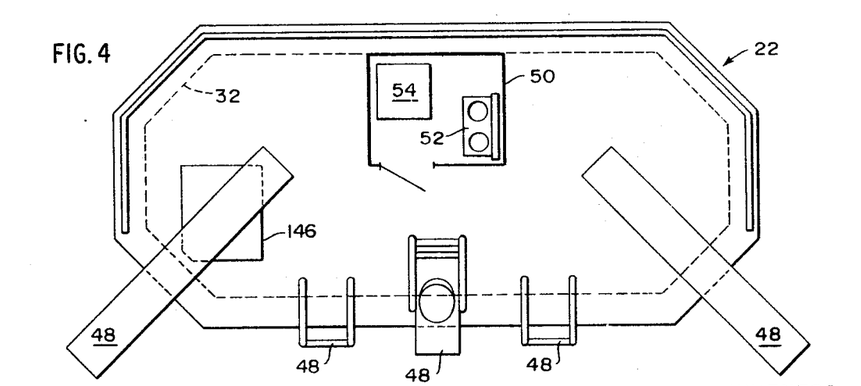
FIG. 4 is a partially diagrammatic plan view of the water purification unit shown in FIGS. 1 and 2.

With reference now to the drawings wherein like reference numerals are used to identify the same elements in the various views, and initially referring to FIGS. 1, 2 and 3, a typical pure water reservoir produced in accordance with the invention is therein shown. In preparing this area from a polluted body of water, such as a lake, indicated at 10, a prefiltering levee 12 such as a bank-run gravel, crushed stone or sand, is constructed from one point on the shore continuously through the lake 10 to a second point on the shore to segregate a reservoir area 14 from the remainder of the lake 16. The water from the reservoir 14 was then continuously pumped into the remainder 16 of the lake 10 to bring the reservoir area to a substantially dry preparation state. While in a dry state, the floor 18 of the reservoir area 14 is, if necessary, cleaned of undesired materials such as decayed foliage, mud and various kinds of debris and rubbish, so as to both decontaminate the area and prepare it for public use. During this dry preparation period, a foundation 20 of concrete or the like for a water purification unit 22 (to be later described in detail) is constructed in the floor 18 together with an umbilical cord for the unit comprising an underground power supply conduit 24 and an underground waste conduit 26 leading from the foundation to the shore. The water purification unit 22 is then installed on the foundation prepared for it, the floor 18 is covered with an inert material 28 such as crushed stone or sand, and the pumping means are removed.

At this point, water from the lake portion 16 seeps through the prefiltering levee 12 to provide a first filtering pass for the water entering the reservoir 14. After the water establishes its surface level indicated at 30, the water purification unit 22 continuously filters and other wise purifies and recirculates it through the reservoir 14 in the manner described hereinafter.

It should be appreciated that a reservoir 14 of any size desired may be prepared depending only on the size of the polluted lake, pond or the like 10 selected and the configuration of the prefiltering levee provided. The levee 12 need not extend between two points on the shore but could even be formed centrally in the water body 10. By using a natural filtering media such as bank-run gravel which can be found in almost any geographical area of our country, the reservoir 14 may be prepared from readily available materials. Moreover, the tools necessary to prepare the site are conventional items available to most municipalities such as trucks, bulldozers and the like to build the levee 12, pumps to maintain the area in a dry state during preparation, and standard excavation or grading equipment to clean the floor 18. Thus, the site may be prepared from conventional materials by using standard tools and unskilled labor in contrast to the high cost necessary to construct an artificial reservoir or pool of comparable size.

If natural filtering media such as gravel is not available, however, the levee 12 may also be prefabricated of plastic, wire mesh and other material as a prefiltering assembly and installed at the site 14. The pure water reservoir 14 may be used as a recreational swimming site or as a source of pure water for human or industrial consumption. Alternately, the invention may be used to purify industrial waste water before its return to the river or lake from whence it was taken. To accomplish the latter function, industrial waste water may be continuously dumped into the main portion 16 of a pool or lake 10. In this instance, the pool 10 is normally a natural or specially excavated cavity located near the original source of the industrial water. The levee 12 provides a first filtering pass for this water, while the unit 22 further purifies it. The water may then be pumped from the reservoir 14 back to its original source. In its latter application, the invention provides an economically feasible means for eliminating pollution from industrial sources.

Figure 5:
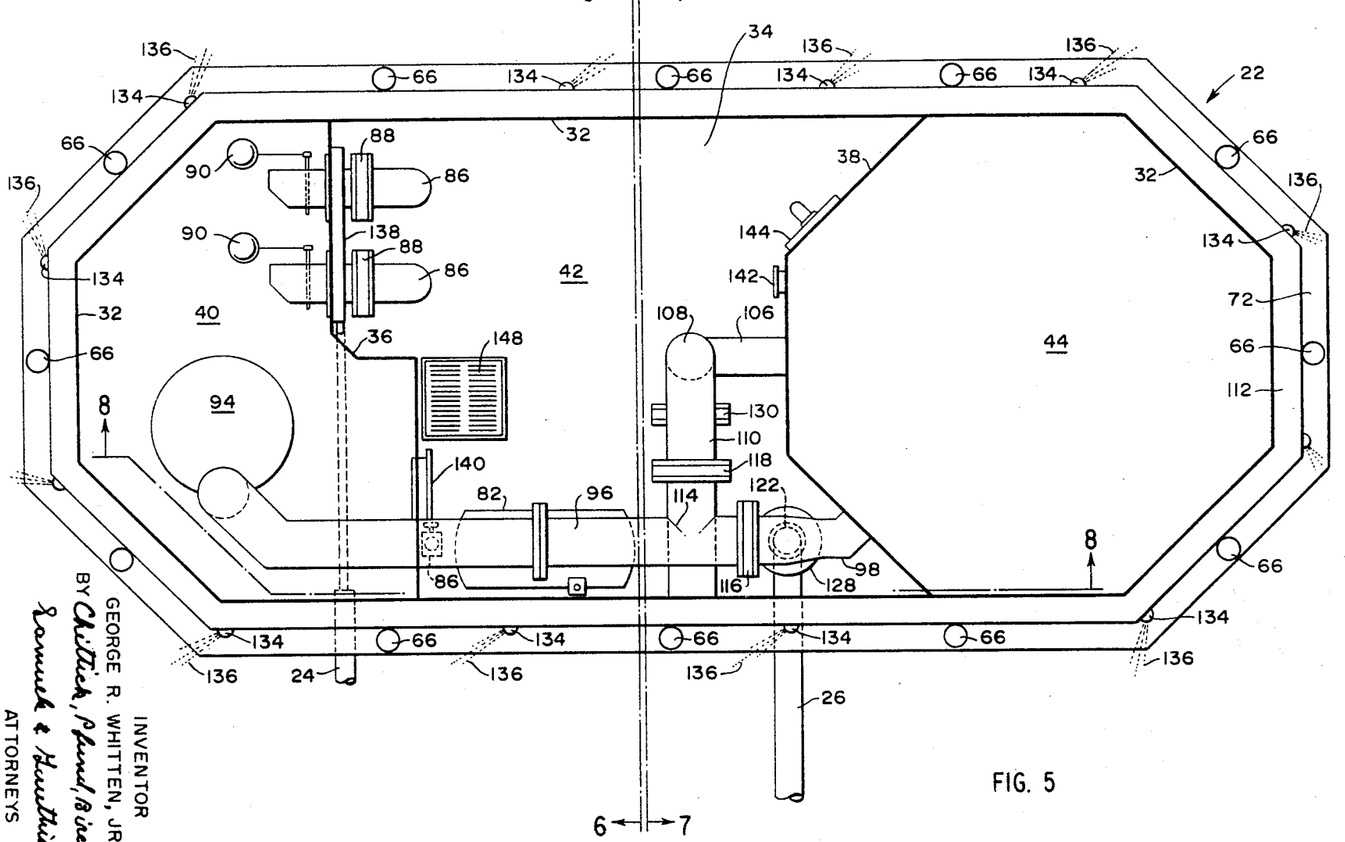
FIG. 5 is a cross section of the unit taken along line 5-5 of FIG. 2.

The description will now focus on the preferred embodiment of the water purification unit 22 as shown in FIGS. 4 through 8. As best seen in FIG. 5, the unit is preferably formed with vertical sheet metal sides 32 to define a partially submerged watertight inner compartment 34. Intermediate partition walls 36 and 38 preferably divide the inner compartment into three watertight chambers, namely, a mixing chamber 40, an intermediate control chamber 42 and a filtering chamber 44. The roof of the unit is preferably a concrete upper deck slab 46 (see FIGS. 4, 6, 7 and 8) which provides ballast necessary to maintain the unit in a partially submerged position and may also function as an equipment platform in the nature of a raft on which diving boards and similar recreational facilities typically indicated at 48 may be mounted if desired. An equipment room 50 is positioned on the upper deck slab 46 to house a means for adding purifying chemicals such as a conventional chlorination unit 52 and also to cover an access hatch 54 to the control chamber 42.

The floor 56 of the unit 22 is also fabricated of sheet metal and is vertically spaced from the foundation 20 by a plurality of vertically disposed submerged inlet grated 58 which completely surround the bottom of the unit to define a cavity 60 beneath the floor 56. The unit 22 is secured to the foundation 20 as by bolts passing between angle irons 62, the submerged inlet grated 58 and the foundation 20, respectively.

Figure 6:
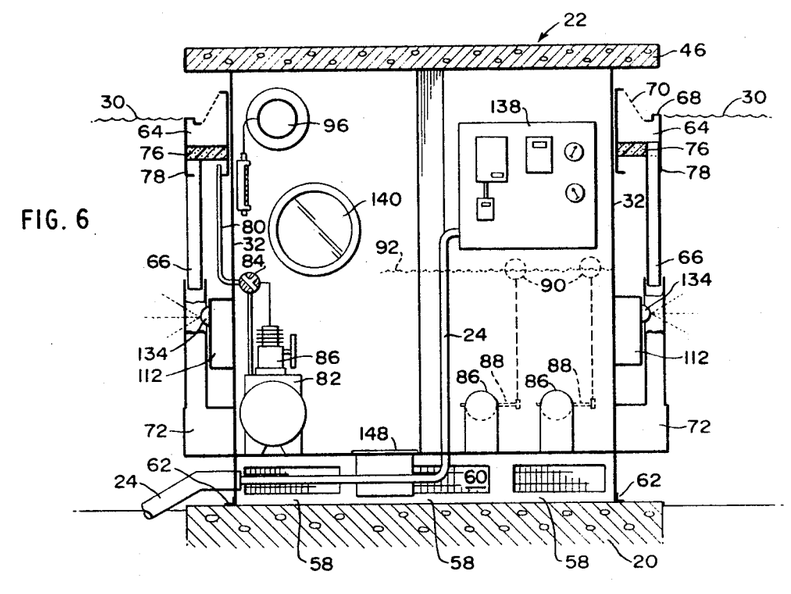
FIG. 6 is a view along line 6-6 of FIG. 5.
Figure 7:
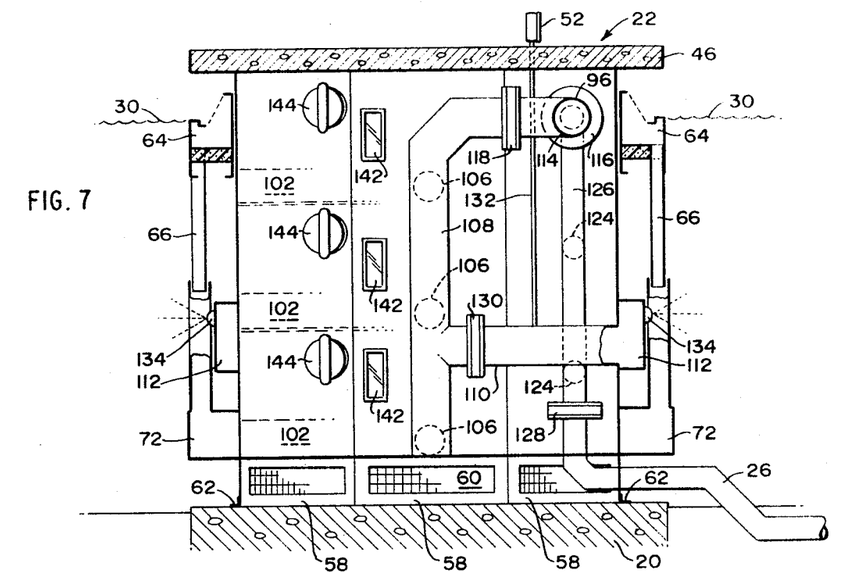
FIG. 7 is a view along line 7-7 of FIG. 5.

Looking now at FIGS. 6 and 7, a skimming ring or gutter 64 is positioned at the water's surface 30 around the upper periphery of the walls 32 and is telescopically supported thereon by a plurality of preferably equally spaced and substantially vertical extensible conduit members 66. The gutter has an outer spillover lip 68 over which surface water from the reservoir 14 may pass into the gutter 64. Perforated skimming gutter intake grills 70 are provided to remove solid matter, such as leaves, floating on the water's surface 30. The skimmed water flow then passes through the extensible conduit members 66 down to a peripheral skimmed water collection duct 72 which is fluidly connected through an aperture 74 (see FIG. 8) in the wall 32 to the mixing chamber 40.

Since most contaminants enter a body of water from its surface, the public health regulations accordingly require that at least half of the water processed by a filtration unit for a municipal swimming facility should comprise water skimmed from the surface. To comply with this requirement for use in the context of natural water bodies wherein the level 30 of the water may vary widely due to seasonal variations of the water shed, heavy rains, wave action, and rapid ingress and egress of swimmers, it is necessary to vary the height of the gutter 64 in response to such surface level changes. To that end, a layer of buoyant material 76 such as cork is adhered to the bottom of the gutter 64 and an air chamber 78 is also formed around the bottom of the gutter ring to roughly maintain the effective specific gravity of the gutter 64 and extensible conduit 66 assembly at neutral buoyancy at design gutter flow.

As seen in FIG. 6, the air chamber 78 is a channel having a bottom opening. A flexible conduit or hose 80 opens into the upper portion of the air chamber 78 and is in fluid communication with an air compressor 82 positioned within the control chamber 42. A three-way solenoid actuated valve 84 having one port open to the atmosphere is provided in the line 80 intermediate the chamber 78 and compressor 82 to regulate the airflow to the chamber 78. The valve 82 is in turn actuated by a level-sensing and transmitter unit 86 typically of the diaphragm type manufactured by the Industrial Division of Honeywell under Specification S 816-5, which unit senses the water level in the mixing chamber 40 and is adapted to electrically switch the solenoid valve 84 to add or exhaust air from the air chamber 78 to provide a fine control over the effective specific gravity of gutter assembly. For example, when the skimming flow rate is too low, indicating that the gutter 64 is too high in the water, the sensing unit 86 will sense a decrease in the mixing chamber lever and switch the valve 84 to exhaust air from the air chamber 78, thereby lowering the gutter 64 and concomitantly increasing the skimming flow rate, On the other hand, when the skimming flow rate is too high, indicating that the gutter 64 is too low in the water and perhaps that the skimming inlet grill 70 is even below the water surface, the sensing unit 86 will sense the resulting increase in the mixing chamber level and switch the valve 84 to add air to the air chamber, thereby raising the gutter 64 to decrease the skimming flow rate. Thus, means are provided for automatically insuring a substantially constant skimming flow rate into the mixing chamber 40.

Water is also taken in by the unit from the lower or submerged portion of the reservoir 14 through the submerged inlet grated 58, which water collects in the bottom cavity 60 and passes into the mixing chamber 40 through conduits 86 extending through the floor 56 into the mixing chamber 40. It should be apparent that unless the submerged inlet flow rate through the submerged inlet conduits 86 are regulated, the water level in the mixing chamber would soon reach the water level 30 of the reservoir 14. This result would be highly undesirable because the skimming flow rate would then fall to zero. To prevent this result, modulating valves 88 with their associated floats 90 are provided the inner ends of the submerged inlet conduits 86 to partially close the conduits 86 for all mixing chamber water levels 92 above a predetermined level. Therefore, for any level 92 above that predetermined level, the floats 90 will partially close the valves 88 so that most of the water being processed represents the skimming flow rate. For optimum recirculation of the reservoir water, the ratio of skimming flow rate to submerged inlet flow rate should be about 3:1. Thus, the modulating valves 88 should be set to always allow a minimum of 25 percent of the overall unit flow rate to pass through the submerged inlet conduits 86, regardless of the mixing chamber level. On the other hand, the gutter 64 should be designed and positioned to provide 75 percent of the total flow rate.

Figure 8:
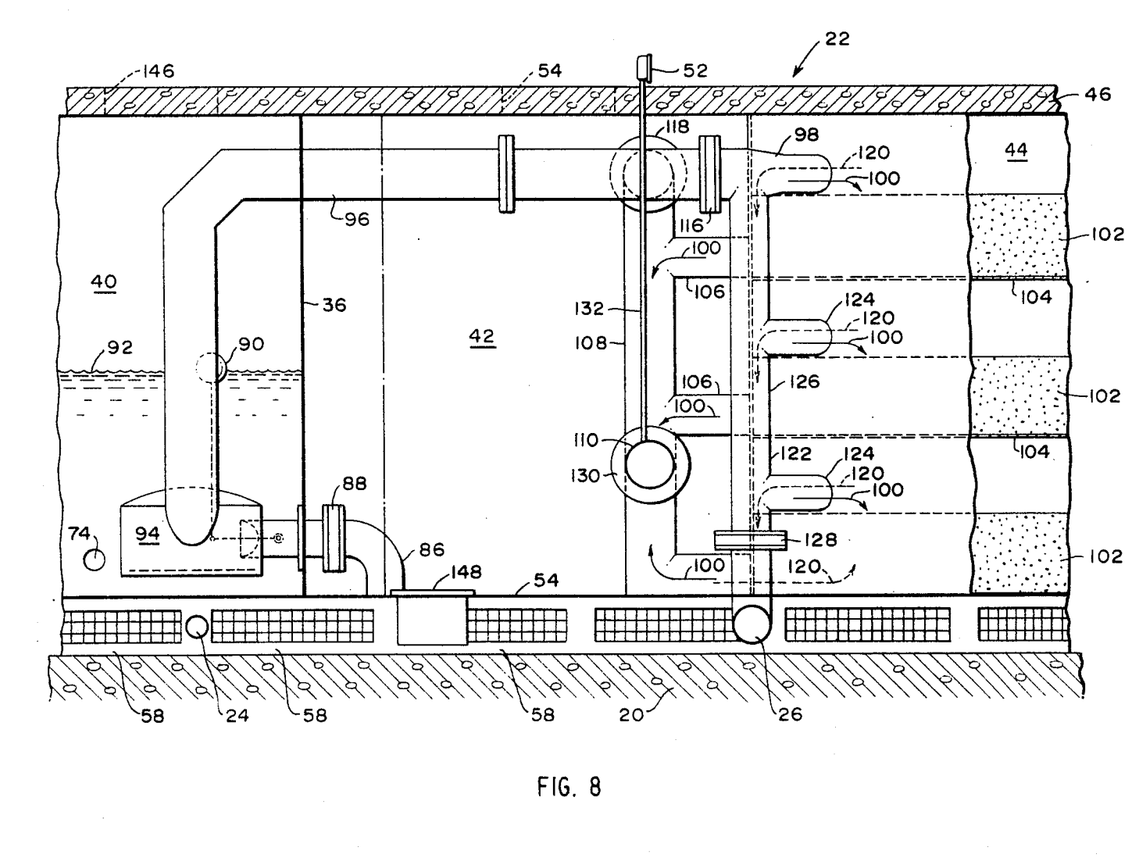
FIG. 8 is a view along line 8-8 of FIG. 5.

As best seen in FIG. 8, a submersible pump and motor 94, typically of the type produced by Flygt Corporation of Sweden, is mounted within the mixing chamber 40 below the predetermined level maintained by the modulating valves 88 to continuously pump intaken water from that chamber to the filtering chamber 44 via a main supply pipe 96 connected at one end to the pressure side of the pump 94 and opening at its other end into a main filter inlet pipe 98. To insure that the pump 94 is always submerged, the submerged inlet conduits 86 should (when fully open) accommodate a flow equal to the total flow of the unit 22 and the modulating valves 88 should open these conduits when the mixing chamber level 92 falls to the point at which the pump is barely submerged. This insures a constant supply for the pump 94 during repositioning or any malfunctioning of the skimming gutter assembly to avoid inadvertent stoppage of the continuous operation of the unit. Moreover, by employing a submersible pump and insuring that it is constantly submerged to avoid its becoming overheated or running dry, the unit 22 may be more compactly designed and operates more quietly than it would if a dry pump were used.

As indicated in FIG. 8 by solid arrows 100, the water then passes through the filter inlet pipe 98 to enter the upper portion of the filtering chamber 44. Three superposed filter layers or cells 102 typically of sand, are provided within the filtering chamber 44 upon perforated plates 104. Contaminants are removed from the water as it passes through the sand layers 102 under the force of the pump 94 and of gravity in a conventional manner. The number and surface area of the filter layers 102 provided may, of course, be varied in accordance with the overall flow rate of the apparatus and the degree of purity required. Present generally accepted practice is to allow about 1 square foot of sand surface area for each 15 gallons per minute to be processed using the high flow rate sand process. I therefore prefer to provide vertically stacked, multiple filter cells in the interest of producing a compact unit which may also purify water at a high flow rate.

The filtered water 100 then passes out from the bottom of each filtering cell 102 through filter outlet pipes 106, which pipes open into a vertical main header pipe 108. A unit outlet pipe 110 interconnects an outlet duct 112 (FIG. 7) peripherally secured to the walls 32 and the main header 108 to enable the filtered water to then flow to the outlet duct 112 for immediate reentry to the reservoir 14.

As it may be periodically necessary to reverse the flow direction through the filter cells 102 to backwash them, the upper end of the main header 108 opens into the main supply pipe 96 at 114. The supply water may be diverted from the filter inlet pipe 98 by closing a line valve 116, preferably of the manually operable wafer type, provided therein and opening a similar valve 118 in the upper portion of the main header 108. The backwash water, as indicated by dotted arrows 120, then enters the lower portion of each filter cell 102 through the filter outlet pipes 106. Contaminants which have accumulated in the filter cell 102 are flushed upwardly by the reversed water flow and are skimmed over to a main backwash outlet pipe 122 through the filter inlet pipe 98 and intermediate pipes 124 positioned at the surface of the lower layers 102, from whence they pass to the waste pipe 26 for deposit in a catch basin 126 (see FIG 1).

To control the flow through this fluid system, the main backwash outlet pipe 122 has a line valve 128 below the intermediate pipes 124 and a line valve 130 is provided in the unit outlet pipe 110. It should thus be apparent that during normal operation, i.e., to accomplish filtering flow 100, the valves 116 and 130 should be open and the remaining valves closed. On the other hand, to switch the fluid system to backwashing flow 120, the valves 118 and 128 should be opened and the valves 116 and 130 closed.

In addition to filtering the processed water, an appropriate amount of purifying chemicals such as chlorine may be introduced from the chlorination unit 52 through a chlorine conduit 132 to the water as it flows through the unit outlet pipe 112 for bacteria and algae control.

Referring once again to FIG. 5, the unit outlet duct 112 has a plurality of equally spaced outlet nozzles 134 which are preferably adjustable both horizontally and vertically. To achieve maximum recirculation of the purified water through the reservoir, I prefer to dispose the outlet nozzles 134 in such a manner as to utilize the earth's rotational forces as an aid to the pressure induced recirculation currents produced by the unit. It is, therefore, preferred that for use in the Southern Hemisphere the nozzles 134 be disposed to emit water in a clockwise direction about the unit as indicated at 136 in FIG. 5. On the other hand, for use in the Northern Hemisphere, the nozzles should be disposed so as to emit water in a counterclockwise direction. For optimum recirculation, the nozzles 134 may also be disposed to emit the processed water in a slightly downwardly direction. By reintroducing the processed water from a central location in this manner, the generally concentric recirculation currents produce a central vortex adjacent the unit 22 and a concomitant hydraulic gradient sloping toward this vortex which causes water from the entire reservoir 14 to gravitate toward the centrally located unit 22 to facilitate continuous purification of the reservoir water.

As seen in FIGS. 6 and 7, the control chamber 42 is provided to give easy access to the operating components of the unit 22 and is preferably large enough to enable a human to move therein. An electrical control panel 138, which is connected to the underground power line 26, is mounted on one wall 36 of the control chamber 42. The controls for the submersible pump 94 and the air compressor 82 are connected to the control panel 138. The various valves are also positioned in the control chamber, as well as a viewing port 140 for the mixing chamber formed in the partition wall 36, while on the other wall 38 viewing ports 142 for the filter cells are provided. To allow access to the filter cells 102, filter cell access manholes 144 are also provided in the wall 38. Access to the mixing chamber 40 is provided by a hatch 146 (FIG. 4) formed in the top deck above the mixing chamber. A drainage sump 148 having a conventional drainage pump (not shown) is provided in the floor of the control chamber 42 to eliminate any undesired water from that chamber.

While the overall dimensions of the unit 22 may be varied at will, the unit should desirably be constructed to accommodate a flow rate acceptable for mass water purification purposes and yet be compact enough to be shipped over conventional transportation, e.g., railroad freight cars or trucks from its point of manufacture to the reservoir site. The unit, therefore, should be capable of processing at least 2000 gallons per minute, and presently available submersible pumps 94 can process 4000 gallons per minute through the unit 22 with a head sufficient to set up effective recirculation currents in the reservoir 14.

Figure 9:
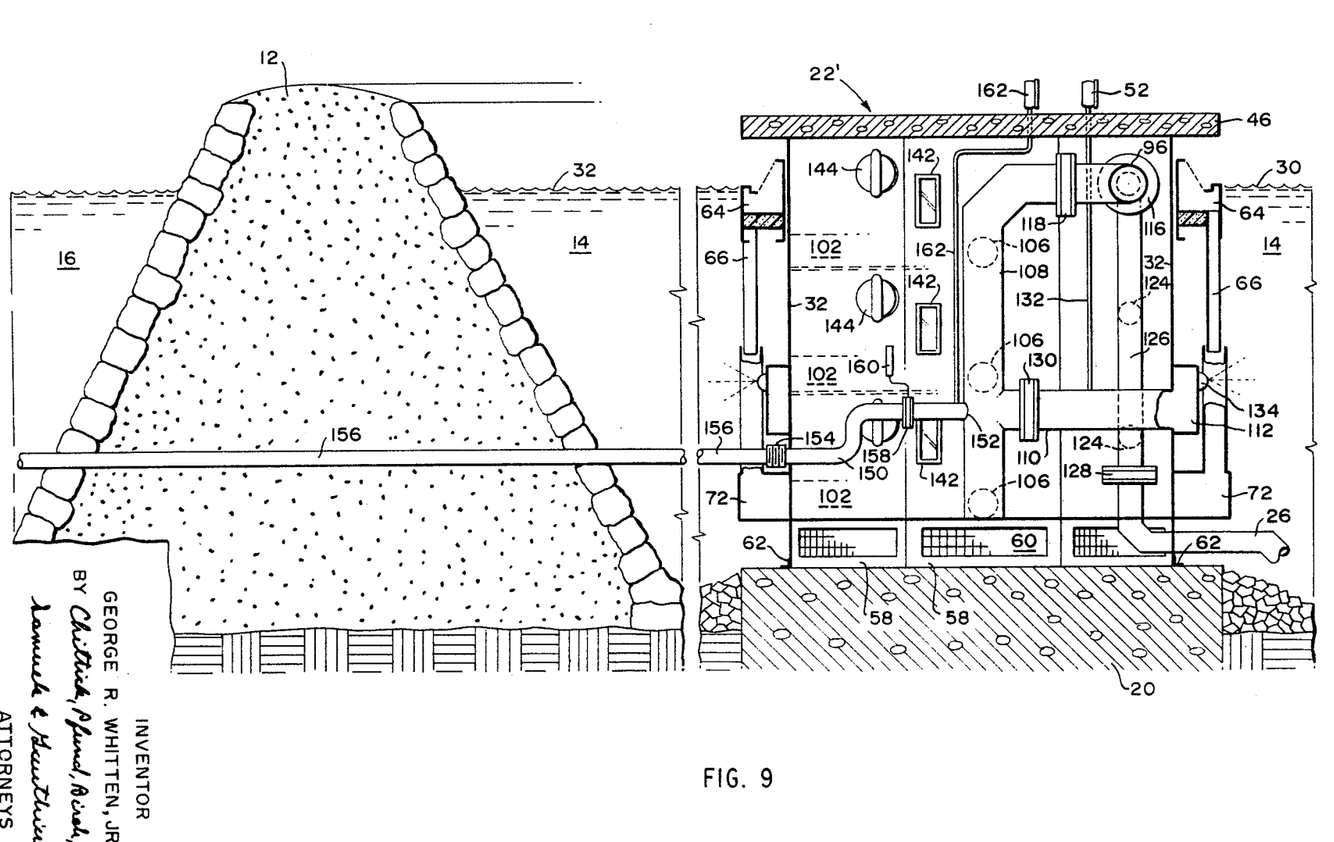
FIG. 9 is a view similar to FIG. 7 showing a modified form of the unit to progressively decontaminate the body of water adjacent the reservoir.

Having thus described the preferred embodiment of the unit 22, a modified version 22' thereof which not only purifies and recirculates the reservoir 14 water but also progressively purifies the remainder 16 of the polluted water body 10 will now be described with reference to FIG. 9. In accordance with this modification, a bypass conduit 150 is fluidly connected at one end 152 to the main header 108 and extends through the walls 32 where it is connected through a flexible coupling 154 to a return conduit 156 passing back to the polluted area 16. The size of the bypass conduit 150 is normally such as to bleed off approximately 5 percent, and preferably no more than 10 percent of the total flow through the unit 22' so that purification of the reservoir water is not impeded. A line valve 158 and flow meter 160 are provided to regulate and indicate the return flow. Moreover, another purifying chemical adding means indicated at 162 is preferably provided to add appropriate purifying chemicals to the return water. The particular chemicals to be added to the return water depends, of course, on the pollution condition of the water body 10. For example, various types of weed and algae inhibitors such as a mild copper sulfate solution, may be injected to progressively decontaminate the main water body 16. Other conventional purifying chemicals like acidic or alkaline mixtures may also be employed as conditions dictate. I prefer to take the return water out of the unit 22' before chlorine is added to the reservoir water through the chlorine conduit 132 so that any wild life present in the main body 16 is not adversely affected.

It should be appreciated that the modified form of the invention may be applied to many situations in which it is desired to purify polluted waters. For example, a number of reservoirs 14 could be constructed along a polluted river to provide adjacent communities with pure water. At the same time the constant influx of pure, treated water into the river would tend to inexpensively decontaminate the entire river flow over a period of time. Similarly, a lake or pond may be gradually and wholly purified in the same manner.

In light of the above description of the invention, the advantages achieved thereby will be now briefly reviewed. By preparing a pure water reservoir from a polluted body of water in accordance with the method of invention, a reservoir area may be developed having all of the advantages of a natural body of water without the need of skilled labor, unusual materials and equipment. The apparatus of the invention may be prefabricated at a remote point, transported to and installed in the prepared site. This unit is entirely self-contained and no external piping either for inlet or for outlet purposes must be constructed in the prepared site. The unit, when working in conjunction with a prefiltering levee, may effectively purify a segment of a polluted body of water which would other wise be useless.

As to the particular features of the unit, mobile skimming rings are preferably provided which can adjust to the varying water levels frequently encountered in natural bodies of water. (The unit, of course, may also be used in artificial pools.) Moreover, by introducing the purified water back to the reservoir from its center and by disposing the outlet nozzles in such a manner as to use the earth's rotational effect, improved recirculation of the purified water is effected. The use of a submersible pump enables the unit to be compactly designed to facilitate prefabrication and portability while also providing a sufficient flow rate for large scale water purification.

Although as described the unit is preferably prefabricated with sheet metal walls, other conventional prefabricated structures may also be employed such as preformed concrete structures.

It is my intention to cover all modifications and equivalents which do not depart from the spirit and scope of this invention as defined by the appended claims.

What I claim is:

1. A water purification unit for purifying a body of water comprising;
   a. walls defining a compartment capable of remaining at least partially submerged in the water body;
   b. means within said compartment defining a mixing chamber constructed and arranged to contain water at a desired level and a filtering chamber;
   c. skimming means for intaking water from the surface of said water body into said mixing chamber;
   d. buoyant means associated with said skimming means to vertically move said skimming means in response to water level changes;
   e. submerged inlet means for intaking water into said mixing chamber from beneath the water's surface;
   f. control means including valve means regulating submerged inlet flow for maintaining the water lever in said mixing chamber beneath that of the water body;
   g. filtering means in said filtering chamber;
   h. outlet means opening directly to said water body;
   i. means for fluidly interconnecting said filtering chamber and said outlet means;
   j. and means for continuously transferring water from said mixing chamber to said filtering chamber, and thence to said outlet means, whereby water may be continuously intaken from and discharged directly to said water body for processing by the unit.

2. The water purification unit of claim 1 in which said skimming means comprises; a skimming gutter and a plurality of substantially vertically disposed, extensible support members secured to said unit to telescopically support said gutter; wherein said buoyant means are secured to said gutter.

3. The water purification unit of claim 2 in which said buoyant means comprises: walls defining an air chamber secured to the bottom of said gutter; an air compressor fluidly connected to said air chamber; means for automatically interconnecting said air compressor and said air chamber to raise said gutter when said gutter is too low relative to the water surface; and means for automatically exhausting air from said air chamber to lower said gutter when said gutter is too high relative to the water surface.

4. The water purification unit of claim 1 wherein said water-transferring means comprises a submersible pump positioned within said mixing chamber below the water body level, conduit means interconnecting the pressure side of said submersible pump and said filtering chamber wherein said control valve means regulates the flow through said submerged inlet means to insure a sufficient submerged inlet flow so that said submersible pump is continually submerged.

5. The water purification unit of claim 4 in which said submerged inlet flow regulating means comprises: valve means provided between said submerged inlet means and said mixing chamber, said valve means being responsive to the level of water in said mixing chamber to insure that the submerged inlet flow be at least 25 percent of the flow through said submersible pump for mixing chamber water levels above that necessary to maintain said submersible pump in submergence.

6. The water purification unit of claim 1 in which said outer walls have a substantially flat configuration.

7. The water purification unit of claim 6 in which said outer walls are prefabricated of sheet metal.

8. The water purification unit of claim 1 in which said outlet means are disposed about the periphery of said outer walls in such a way as to use the earth's rotational forces to effectuate circulation of the water throughout the said body.

9. The water purification unit of claim 4 in which said filtering means comprises a plurality of superposed sand filter cells capable of filtering at least 2000 gallons per minute of water, and wherein said submersible pump has a capacity to deliver 2000 gallons per minute to said filtering means.

10. The water purification unit of claim 1 which further includes means for adding purifying chemicals to the processed water.